(12) United States Patent
Gebel et al.

(10) Patent No.: US 12,320,301 B2
(45) Date of Patent: Jun. 3, 2025

(54) COMBUSTION CHAMBER MODULE HAVING AN ANNULAR COMBUSTION CHAMBER

(71) Applicant: Rolls-Royce Deutschland Ltd & Co KG, Blankenfelde-Mahlow (DE)

(72) Inventors: Gregor Christoffer Gebel, Ludwigsfelde (DE); Carsten Clemen, Mittenwalde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/782,262

(22) Filed: Jul. 24, 2024

(65) Prior Publication Data

US 2025/0052198 A1 Feb. 13, 2025

(30) Foreign Application Priority Data

Aug. 7, 2023 (DE) ...................... 10 2023 207 553.9

(51) Int. Cl.
*F02C 7/22* (2006.01)
*F02C 9/40* (2006.01)

(52) U.S. Cl.
CPC .............. *F02C 7/222* (2013.01); *F02C 9/40* (2013.01); *F05D 2240/60* (2013.01)

(58) Field of Classification Search
CPC ......... F02C 7/222; F02C 9/40; F05D 2240/60
See application file for complete search history.

(56) References Cited

U.S. PATENT DOCUMENTS

| 10,072,845 | B2 | 9/2018 | Mook | |
|---|---|---|---|---|
| 2009/0145131 | A1 | 6/2009 | Kreutle | |
| 2011/0061569 | A1* | 3/2011 | Devroe | ................. F27D 17/004 |
| | | | | 432/116 |
| 2014/0291418 | A1 | 10/2014 | Ruffing | |
| 2017/0299190 | A1 | 10/2017 | Patel | |
| 2022/0356845 | A1 | 11/2022 | Morenko | |

FOREIGN PATENT DOCUMENTS

| DE | 4240222 A1 | 6/1993 |
|---|---|---|
| EP | 1445540 A1 | 8/2004 |

OTHER PUBLICATIONS

German Search Report dated May 24, 2024 from counterpart German App No. 10 2023 207 553.9.

* cited by examiner

*Primary Examiner* — Steven M Sutherland
(74) *Attorney, Agent, or Firm* — SHUTTLEWORTH & INGERSOLL, PLC; Timothy J. Klima

(57) ABSTRACT

The invention relates to a fluid supply assembly having a line assembly from a fluid reservoir to a target location for supplying a fluid mass flow in a variable supply quantity, in particular for supplying fuel from a fuel reservoir to a combustion chamber, having a primary mass flow supplied or able to be supplied via a primary line and a secondary mass flow supplied or able to be supplied via a secondary line. An advantageous adaptation of the fluid mass flow, in particular fuel mass flow, to variable operating conditions is achieved in that disposed in the primary line and/or the secondary line is a passively operating restrictor which is invariable in its geometry and is without moving parts, by which the mass flow ratio of primary mass flow and secondary mass flow is altered as a function of the fluid mass flow supplied via the line assembly.

13 Claims, 3 Drawing Sheets

COMBUSTION CHAMBER MODULE HAVING AN ANNULAR COMBUSTION CHAMBER

This application claims priority to German Patent Application 102023207553.9 filed Aug. 7, 2023, the entirety of which is incorporated by reference herein.

The invention relates to a fluid supply assembly having a line assembly from a fluid reservoir to a target location for supplying a fluid mass flow in a variable supply quantity, in particular for supplying fuel from a fuel reservoir or from a fuel distribution line (such as a fuel ring line) to a combustion chamber, having a primary mass flow supplied or able to be supplied via a primary line and a secondary mass flow supplied or able to be supplied via a secondary line. Furthermore, the invention relates to a nozzle device and to an engine which have such a fluid supply assembly.

A fluid supply assembly of this kind is specified in U.S. Pat. No. 10,072,845 B2 in the context of a nozzle device of an engine. In this case, for supplying a main fuel mass flow there is a primary line as the main line, and for supplying a pilot fuel mass flow there is a pilot line as a secondary line, the latter being centrally disposed within an inner air duct for the fuel injection.

US 2014/0291418 A1 also shows a fluid supply assembly in the context of a nozzle device of an engine, wherein a main fuel mass flow is supplied via a main line, and a pilot fuel mass flow is supplied via a pilot line, for injection into a combustion chamber. The pilot line is not centrally disposed.

A further fluid supply assembly in the context of a nozzle device of an engine is proposed in EP 1 445 540 A1. Here too, a main fuel mass flow is supplied via a main line and a pilot fuel mass flow is supplied via a pilot line for injection into a combustion chamber, wherein the pilot line is centrally disposed. In this case, the fluid supply assembly has a valve device to control the fuel mass flow through the main line on the one hand, and the pilot line on the other hand.

In a fluid supply assembly in which the fuel is divided between the main line and the pilot line by means of a valve device, either valves or solenoid valves which are passively controlled, i.e. by way of a variable fuel mass flow, or valves or solenoid valves which are actively controlled with an actuator can be used.

In a fuel supply assembly without valves, the fuel mass flows are fixedly divided between the main and pilot line or main and pilot stage as a percentage of the total mass flow, e.g. 90%/10% or 80%/20%, etc. Both fuel lines are supplied by a supply line from the so-called fuel manifold or the line from the fuel tank or a pump, and there is no active control that influences the distribution of the fuel mass flows. Such a fluid supply assembly with a piloted fuel nozzle, specifically a nozzle device 3 with a main line 50 and a pilot line 60 is shown in FIG. 1. The distribution is purely due to the geometric design of the lines. This is in particular a function of the area (area effectively passed through by the flow, or cross-sectional area) of the line, its length, the number of bends and the wall roughness, optionally via orifices installed in the lines as restrictor elements. This results in the fuel mass flow ratio MH/MP (fuel mass flow via the main line to fuel mass flow via the pilot line), which remains approximately constant over the entire operating range, e.g. of an engine. The total mass flow M=MH+MP varies over the operating range and increases with increasing fuel pressure P1 and (less intensely increasing) combustion chamber pressure P2 (and thus increasing pressure difference P1–P2), in order to correspondingly provide larger quantities of fuel, e.g. for the take-off of the aircraft in comparison, e.g., to the idling operation, as shown schematically in the diagram of FIG. 2.

FIG. 1 shows schematically in a schematic diagram a fragment of an engine according to the prior art, having the connection of the fluid supply assembly 100 to a fuel manifold 1 or the fuel ring line, a combustion chamber 2, a fuel nozzle 3, a distributor 4, a primary line 5 acting as a main line, a secondary line 6 acting as a pilot line, and a combustion chamber housing 7. There is no active feedback-control. Illustrated in the diagram of FIG. 2 is the pressure P (fuel pressure P1, combustion chamber pressure P2) and the fuel mass flow M over the operating range of an engine from idling (idle, low compressor outlet or combustion chamber inlet temperature T30) to taking off (take-off, high compressor outlet or combustion chamber inlet temperature T30).

A constant distribution of the fluid mass flows over an operating range with varying mass flow, such as the fuel mass flows between the main and pilot lines over the operating range of an engine, is particularly unfavorable for pollutant emissions, especially soot. Therefore, valves are typically used in such fluid supply assemblies to influence the ratio of the two mass flows in relation to one other, or to switch off one of the two mass flows across part of the operating range. The design and control of the valves has the disadvantage of high complexity, high weight, low reliability and correspondingly high maintenance requirements and associated costs.

The present invention is based on the object of providing a fluid supply assembly that requires as little complexity as possible and contributes to a reliable, environmentally friendly mode of operation.

This object is achieved according to the invention in a fluid supply assembly having features as disclosed herein. It is provided herein that disposed in the primary line and/or the secondary line is a passively operating, in particular rotationally symmetrical, restrictor which is invariable in its geometry and is without moving parts, by which the mass flow ratio of primary mass flow and secondary mass flow is altered as a function of the fluid mass flow supplied via the line assembly.

Likewise, the object is also achieved in a nozzle device and in an engine, which have a fluid supply assembly constructed in this way.

The fluid supply assembly having the features specified in the characterizing part results in a robust construction with little design complexity since the line provided with the restrictor has a design which is invariable in its geometry and is without moving parts; in this way, the ratio of the fluid mass flows flowing through the primary line and the secondary line is influenced purely passively as a function of changing operating conditions. This provides the possibility of an optimal adjustment to given operating conditions. Thus, for example, an advantageous adaptation to operating point-dependent fuel flows can be achieved, whereby the fuel mass flows supplied via the main line and the pilot line are optimized with a view to the lowest possible emission operation. Optimization of the fluid mass flow ratio with a view to other flow requirements or operating parameters is also possible. In addition to emissions, this can also influence the operating stability, e.g. firing behavior, lean-burn-out or else the thermoacoustic behavior.

An embodiment which is advantageous in terms of construction and function lies in that the line assembly, upstream of a branch-off, has a common fluid supply line, in particular fuel supply line, which is divided into the primary line and the secondary line.

An embodiment which is advantageous in terms of function and application furthermore lies in that the restrictor is disposed in the primary line, in that, in terms of a given minimum fluid mass flow, the fluid mass flow is supplied to more than 50%, in particular to more than 60% or more than 80%, via the primary line, and the remaining proportion of the fluid mass flow is supplied via the secondary line, as a result of which a minimum mass flow ratio is given, and that the restrictor is designed in such a way that the mass flow ratio increases steadily with increasing fluid mass flow until a certain maximum mass flow is reached. A start-up section is required in front of the restrictor in the primary line; this start-up section should constantly have the larger diameter D over a certain length (see FIG. 3).

The construction and the function can be furthermore adapted to predefined operating conditions in that disposed in the secondary line is an in particular rotationally symmetrical restrictor orifice for setting a predetermined minimum secondary mass flow, the orifice opening diameter of said restrictor orifice being smaller than the diameter of the secondary line. This advantageously permits fine adjustment or trimming to be carried out, whereby a simple small orifice is sufficient.

An embodiment which is advantageous in terms of construction and functional mode lies in that the restrictor is designed as a long orifice of which the inner diameter is smaller than that of the associated line—primary line or secondary line—and of which the length is a multiple of, in particular at least 4 times, its inner diameter.

Further advantageous measures in terms of construction and function are derived from the fact that the restrictor is designed as a long orifice in such a way that a Reynolds number of, for example, at most approximately 500 or insignificantly more is derived at a predetermined minimum fluid mass flow at a predetermined diameter of the associated line. The objective here is to achieve a low Reynolds number in the low-load range, where the total fluid mass flow is low. In this range the proportion of the secondary flow should be greater than in higher load ranges. At higher loads, the Reynolds number should increase significantly in such a way that the relative secondary current is reduced. This is achieved according to the invention.

In addition, the measures that a sharp-edged inlet lip or inlet edge is present at the entrance of the orifice opening of the restrictor, in particular an inlet lip or inlet edge that is orthogonal to the longitudinal axis of the latter, contribute to an advantageous functional mode. The material of the lip is chosen to be wear-resistant, e.g. from a cobalt superalloy or from a tool steel, in order to ensure high durability (without rounding of the edges) over a long operating period.

Furthermore, it contributes to a well-tunable operating mode that a laminarizer for generating a laminar starting section of the flow is disposed in front of and spaced apart from the entrance of the restrictor in the associated line—primary line or secondary line.

A well-tunable adjustment over a larger operating range is also advantageously achieved by the fact that the fluid is kerosene or a kerosene-like fuel. Kerosene in the context of the restrictor designed as a long orifice, has the particular advantage that its flow coefficient increases at low mass flows with the Reynolds number (or with the mean flow rate), wherein the fuel property remains substantially constant over the respective range of the flow rate.

In the context of the nozzle device, an advantageous embodiment lies in that the nozzle device is disposed between a supply portion, in particular a distributor, of the fluid supply assembly and a combustion chamber and has a nozzle shaft attached to a combustion chamber housing and that the restrictor is disposed in a portion of the primary line or the secondary line which in terms of the flow direction is in front of the nozzle shaft or within the nozzle shaft.

Another advantageous construction of the nozzle device lies in that the primary line is a main line and the secondary line is a pilot line of a fuel supply assembly, wherein the restrictor is disposed in the main line.

This results in an advantageous function when it is provided that the pilot line is disposed in the center of a nozzle portion directed toward the combustion chamber of the nozzle device on the nozzle axis.

The fluid is preferably a liquid medium, such as liquid fuel, preferably kerosene or a kerosene-like fuel.

The invention will be explained in more detail hereunder by means of exemplary embodiments with reference to the drawings. In the drawings.

Figure 3:
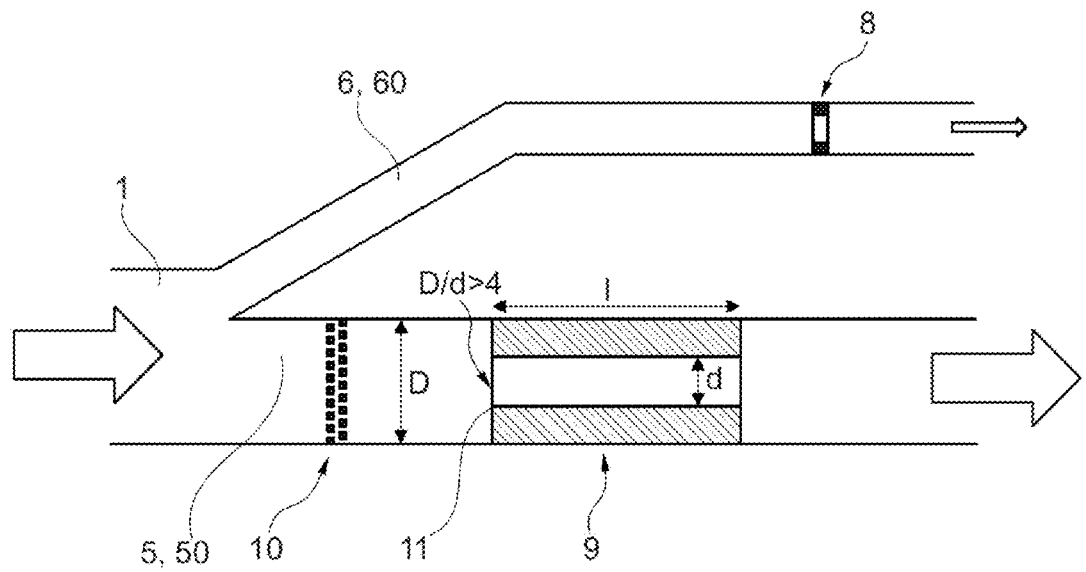
Figure 4:
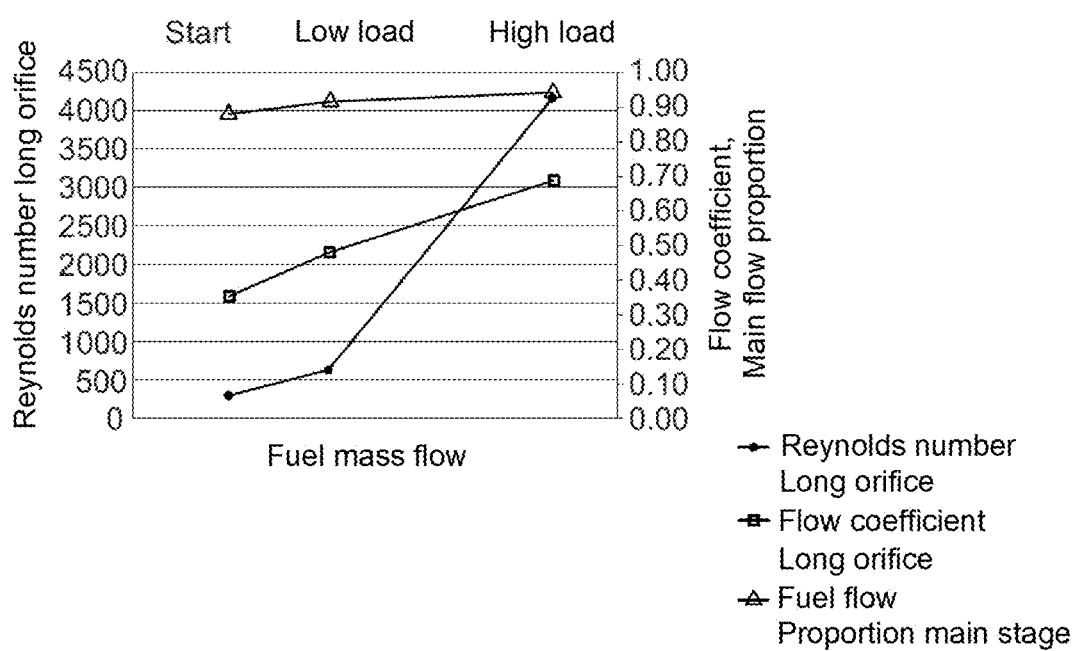
Figure 5:
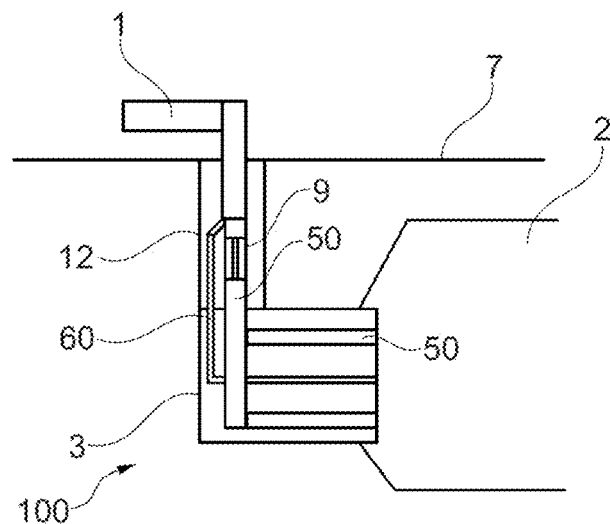
Figure 6:
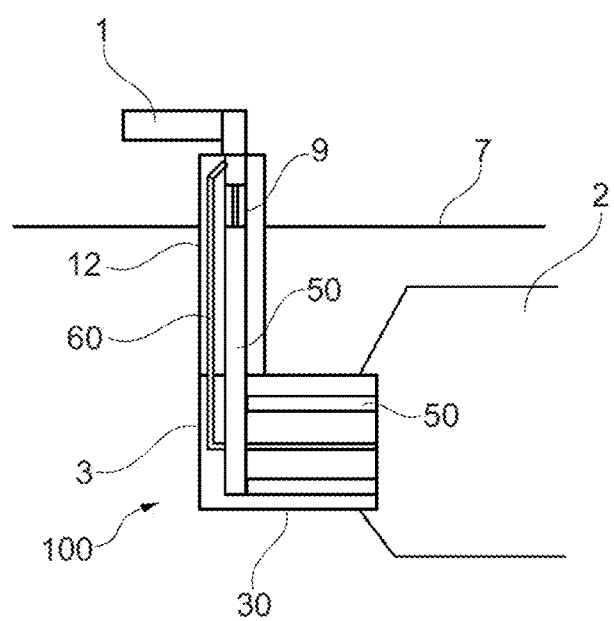

FIG. 3 shows a portion of the nozzle device comprising a primary line or main line provided with a restrictor, and a secondary line or pilot line provided with a restrictor orifice, in schematic illustration, FIG. 4 shows a diagram showing an exemplary profile of the fuel flow, the Reynolds number and the flow coefficient at a fuel mass flow through the main line with increasing fuel mass flow in an operating range from start-up via a low load to a high load;

FIG. 5 shows a fragment of a fuel supply assembly which is connected to a fuel supply line and leads to a combustion chamber in a configuration according to the invention; and FIG. 6 shows another exemplary embodiment of a fuel supply assembly according to the invention, which is connected to a fuel supply line.

Figure 1:
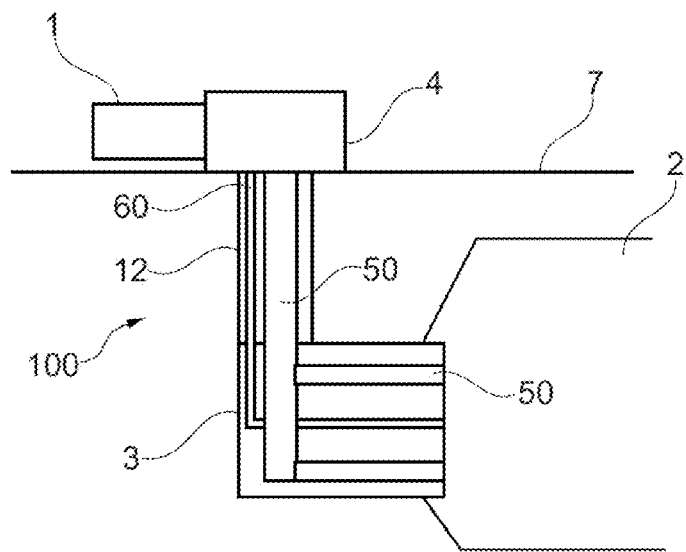
FIG. 1 shows a fragment of a fluid supply assembly, for example of an engine, having a nozzle device which is connected to a fuel supply line (fuel manifold) on the inlet side via a distributor and to a combustion chamber on the outlet side, according to the prior art in a schematic illustration.

FIG. 1 schematically shows a nozzle device 3 having a fluid supply assembly 100 (presently for supplying fuel), which is connected on the inlet side via a distributor 4 on a fuel supply line 1, in particular designed as a fuel manifold, to a fluid reservoir (not shown), and on the outlet side to a combustion chamber 2. The nozzle device 3 is attached to a combustion chamber housing 7 by a nozzle shaft 12, for example via a flanged connection, and comprises a line assembly running through said nozzle shaft 12, with a primary line 5 acting as a main line 50 for a fuel proportion and a secondary line 6 acting as a pilot line 60 for a further fuel proportion. The nozzle shaft 12 is adjoined by a nozzle portion which extends to the combustion chamber and in which the main line 50 and the pilot line 60 run onward to the combustion chamber 2 in order to inject the fuel into the latter in a defined manner and to allow the combustion procedures of the engine to be performed. The nozzle device 3 herein is designed as a so-called piloted fuel nozzle which has a nozzle with a main fuel channel through the main line 50 and a central second fuel channel with the pilot line 60, and does not comprise valves for influencing the fuel mass flows through the main line 50 and pilot line 60. This results in a fixed distribution of the fuel mass flows as a percentage of the total fuel mass flow, e.g. 90%/10% main to pilot stage or 80%/20% etc. In this instance, both fuel lines are supplied by a supply line from the so-called fuel manifold or the fuel line from the fuel reservoir (fuel tank), or the pump, and there is no active feedback-control which influences the distribution of the fuel flows, as is also explained at the outset by means of FIG. 1.

Figure 2:
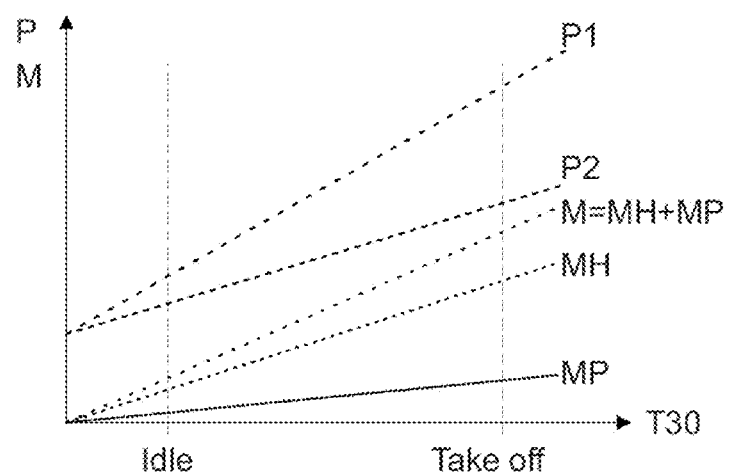
FIG. 2 shows a diagram with a schematic illustration of the pressure and the fuel mass flow over an operating range of an engine from idling (idle, low compressor outlet or combustion chamber inlet temperature T30) to taking off (take-off, high compressor outlet or combustion chamber inlet temperature T30)

This results in the fuel mass flow ratio MH/MP of the fuel mass flow through the main line 50 (MH) to the fuel mass flow through the pilot line 60 (MP), which remains approximately constant over the entire operating range, as can be seen in the diagram according to FIG. 2. The total fuel mass flow M as the sum of the main fuel mass flow and the pilot fuel mass flow M=MH+MP varies over the operating range and increases with increasing fuel pressure P1 and (less intensely increasing) combustion chamber pressure P2 (and thus increasing pressure difference P1–P2), in order to provide correspondingly larger quantities of fuel, e.g. for the take-off of the aircraft (take-off) compared to, for example, idling mode (idle), as can be seen from FIG. 2. This shows a diagram of the pressure and the fuel mass flow over the operating range of the engine from idling (idle, lower compressor outlet or combustion chamber inlet temperature T30) to taking off (take-off, high compressor outlet or combustion chamber inlet temperature T30) in a schematic illustration.

According to the solution according to the invention, as explained with reference to FIGS. 3 to 6, it is achieved in contrast to the conventional structure that the ratio of the fluid mass flow of a mass flow of the primary line 5 to a mass flow of the secondary line 6, in particular of the fuel mass flow of the main line 50 to the fuel mass flow of the pilot line 60, is not constant over the operating range, but varies in such a way that the mass flow through the main line 50 steadily approaches a maximum value, whereby the mass flows through the main line 50 and the primary line 60 are not influenced by valves.

As shown in the diagram in FIG. 4, when starting the engine having the inventive nozzle device 3, 90% of the fuel is supplied through the main line 50 and 10% through the pilot line 60 during idling, for example. When revving up the engine via low load to high load, as under max. take-off conditions, this proportion is increased to 95% through the main line 50, while the proportion of the pilot line decreases to 5%.

A significant advantage achieved by these measures according to the invention lies in that a high relative mass flow flows through the pilot line 60 only at low operating conditions, and can be utilized in the latter for stabilizing the flame, while this proportion is reduced at high operating conditions, since this stabilization is not necessary at this point. This makes it possible to minimize the negative effects of piloting, for example on soot emissions. The diagram in FIG. 4 also contains the increase in the Reynolds number associated with the increasing fuel mass flow, and the increasing flow coefficient of a restrictor 9 in the form of a long orifice used according to the invention, as explained hereunder with reference to FIG. 3.

FIG. 3 shows a fragment of a fluid supply assembly 100 according to the invention having a portion of a fuel supply line 1, which branches out at a branch-off into a primary line 5, which acts as a main line 50, for example, and a secondary line 6, which acts as a pilot line 60, wherein the main line 50 has a larger flow cross-section with a diameter D than the pilot line 60. The fuel supply line 1 is preferably divided within the fuel nozzle 3 or alternatively outside the fuel nozzle. This preferably takes place by means of a Y-shaped or angular discharge line.

Optionally provided in the pilot line 60 is an—in particular rotationally symmetrical—restrictor orifice 8 for tuning or trimming the maximum mass flow (e.g. 10%), whereby the orifice opening diameter can be selected accordingly, whereby the latter is always significantly smaller than the diameter of the line per se. For adjusting the variable fluid mass flow or fuel mass flow, a specially designed—in particular rotationally symmetrical—restrictor 9, in particular designed as a long orifice, is disposed in the main line 50, the flow characteristic of which regulates the flow of the fluid or fuel depending on the flow rate. The flow rate herein depends directly on the operating pressure and thus the flight status or operating state of the engine. At idling, this results in a low pressure and a correspondingly low mass flow at low speed and at a low Reynolds number. When taking off (take-off) or at high load, the result is a high pressure with high mass flow and high speed and high Reynolds number.

In order to achieve this advantageously, a laminarizer 10, for example formed as a screen or honeycomb structure or the like, is introduced into the main line 50 upstream of the entrance of the restrictor 9, in order to effect a laminar start-up section of the flow in the main line 50, in one variant of the design. The restrictor 9, which is designed as a long orifice, has a sharp-edged inlet lip in an entrance plane which is, for example, orthogonal to the longitudinal axis of said restrictor 9. In order to ensure a high stability of the inlet lip over a long operating period, the material of the inlet lip 11 is chosen to be wear-resistant, such as cobalt superalloy or tool steel, for example. The ratio of the inner diameter D of the main line 50 to the inner diameter d of the long orifice is at least four. Furthermore, the length l of the restrictor 9 or the long orifice is at least four times as large as its inner diameter d, i.e. l/d≥4.

For such a long orifice, the flow coefficient $C_d$ can be calculated according to $$\frac{1}{C_d} = \frac{1}{C_{du}} + \frac{20}{Re_h}\left(1 + 2.25\frac{l}{d}\right)$$

as a function of the ratio l/d of the orifice through-bore, the Reynolds number (referring to d, the kinematic viscosity of the fluid v and the velocity through the long orifice $u_d$)

$$Re = \frac{u_d d}{v}$$

and of the maximum flow coefficient $C_{du}$ $$C_{du} = 0.8270 - 0.0085\frac{l}{d}$$

(Lichtarowicz, A, Duggins, R K and Markland, E (1965), "Discharge coefficients for incompressible non-cavitating flow through long orifices", Journal of Mechanical Engineering Science, Vol. 7, Iss. 2, pp. 210-219). This then results in the flows through the pilot line 60 and the main line 50 as a function of the operating state.

In the configuration of the fluid supply assembly 100 according to the invention, in the present case of the fuel supply assembly, or of the nozzle device 3, the fact is used that a long orifice at very low Reynolds numbers has a lower flow coefficient Ca than at high Reynolds numbers. This in turn is utilized by selecting the main flow supply line to the long orifice in terms of its diameter (e.g. 40 mm) in such a way that the fuel flow is very slow and also through the long orifice (e.g. maximum 10 mm) is still so slow that low Reynolds numbers (for example 500 or less) are set. The flow coefficient Ca is then 0.35, for example. This now results in a ratio of the mass flow components of, for example, 90% to 10% (main fuel mass flow to pilot fuel mass flow) compared to the pilot line 60 (of which the flow characteristics are determined by the diameter of the latter and the potentially used restrictor orifice 8). If the total mass flow of fuel (e.g. for the high-load operation of the engine) increases significantly, the flow rates in the lines are also significantly higher. Consequently, the flow through the long orifice also has a significantly higher Reynolds number (for example 4000). Consequently, the flow coefficient increases to 0.7. This is approximately double in comparison to the case described above for a low-load condition. Consequently, a relatively larger proportion of the total mass flow flows through the main line 50. For example, the mass flow ratio is now 95% main fuel mass flow to 5% pilot fuel mass flow.

FIGS. 5 and 6 show examples of the integration of the configuration according to the invention with the main line 50 comprising the restrictor 9, wherein the respective line portion with the branch-off is disposed within the nozzle shaft 12 (FIG. 5) or outside, presently above, of the nozzle shaft 12.

The invention claimed is:

1. A fluid supply assembly comprising:
   a line assembly for supplying a fluid mass flow of fuel in a variable supply quantity from a fuel reservoir to a combustion chamber of an engine, the fluid mass flow including a primary mass flow supplied via a primary line and a secondary mass flow supplied via a secondary line,
   a restrictor disposed in the primary line and having an inner diameter less than that of the primary line, the restrictor being is a passively operating and having an invariable geometry without moving parts, by which a mass flow ratio of the primary mass flow to the secondary mass flow is altered as a function of the fluid mass flow supplied via the line assembly;
   the fluid mass flow being supplied as more than 50% via the primary line and a remaining proportion of the fluid mass flow via the secondary line, as a result of which a minimum mass flow ratio is given;
   wherein the restrictor is configured as a long orifice having a length that is a multiple of greater than 1 of the inner diameter and a Reynolds number of not more than 1000 is obtained at a predetermined minimum fluid mass flow at the inner diameter, such that the mass flow ratio increases steadily with increasing fluid mass flow until a certain maximum mass flow is reached;
   wherein the primary line is a main line and the secondary line is a pilot line of the fuel supply assembly;
   wherein the minimum mass flow ratio, where a relatively high proportion of the secondary mass flow flows through the pilot line, occurs at low engine operating conditions for stabilizing a flame in the combustion chamber, while a higher mass flow ratio, where a lower proportion of the secondary mass flow flows through the pilot line, occurs at higher engine operating conditions.

2. The fluid supply assembly according to claim 1, wherein the line assembly has a common fuel supply line which is divided into the primary line and the secondary line.

3. The fluid supply assembly according to claim 1, wherein
   the fluid mass flow being supplied is more than 60% via the primary line and the remaining proportion of the fluid mass flow via the secondary line.

4. The fluid supply assembly according to claim 1, and further comprising, disposed in the secondary line, a rotationally symmetrical restrictor orifice for setting a predetermined minimum secondary mass flow, an orifice opening diameter of said restrictor orifice being smaller than a diameter of the secondary line.

5. The fluid supply assembly according to claim 1, wherein the restrictor is configured as a long orifice of which an inner diameter is less than that of the primary line and of which the length is at least 4 times the inner diameter.

6. The fluid supply assembly according to claim 1, and further comprising a sharp-edged inlet lip at an entrance of an orifice opening of the restrictor, said sharp-edged inlet lip being orthogonal to a longitudinal axis of the restrictor.

7. The fluid supply assembly according to claim 1, and further comprising a laminarizer for generating a laminar starting section of a flow is disposed in front of and spaced apart from an entrance of the restrictor in the primary line.

8. The fluid supply assembly according to claim 1, wherein the fluid is kerosene.

9. A fuel nozzle device, including the fluid supply device according to claim 1.

10. The fuel nozzle device according to claim 9, wherein
    the nozzle device is disposed between a supply portion, of the fluid supply assembly and a combustion chamber, and has a nozzle shaft attached to a combustion chamber housing; and
    the restrictor is disposed in a portion of the primary line which in terms of a flow direction is upstream of the nozzle shaft or within the nozzle shaft.

11. The fuel nozzle device according to claim 9, wherein the pilot line is disposed in a center of the fuel nozzle device that is directed toward the combustion chamber on a nozzle axis.

12. An engine including the fluid supply assembly according to claim 1.

13. The fluid supply assembly according to claim 1, wherein
    the fluid mass flow being supplied is more than 80% via the primary line and the remaining proportion of the fluid mass flow via the secondary line.

* * * * *